United States Patent
Scheidegger et al.

(10) Patent No.: US 11,210,578 B2
(45) Date of Patent: Dec. 28, 2021

(54) AUTOMATIC DETERMINATION OF COGNITIVE MODELS FOR DEPLOYMENT AT COMPUTERIZED DEVICES HAVING VARIOUS HARDWARE CONSTRAINTS

(71) Applicant: International Business Machines Corporation, Armonk, NY (US)

(72) Inventors: Florian Michael Scheidegger, Effretikon (CH); Roxana Istrate, Adliswil (CH); Giovanni Mariani, Zurich (CH); Konstantinos Bekas, Horgen (CH); Adelmo Cristiano Innocenza Malossi, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 16/217,760

(22) Filed: Dec. 12, 2018

(65) Prior Publication Data

US 2020/0193266 A1 Jun. 18, 2020

(51) Int. Cl.
*G06N 3/04* (2006.01)
*G06N 3/08* (2006.01)

(52) U.S. Cl.
CPC ............... *G06N 3/04* (2013.01); *G06N 3/086* (2013.01)

(58) Field of Classification Search
None
See application file for complete search history.

(56) References Cited

U.S. PATENT DOCUMENTS

2015/0332165 A1 11/2015 Mermoud et al.
2015/0379429 A1* 12/2015 Lee .................. G06N 20/00
706/11

(Continued)

FOREIGN PATENT DOCUMENTS

IN 201711022439 A 7/2017
WO 2018/009205 A1 1/2018

OTHER PUBLICATIONS

Microsoft, "Resource-efficient ML for Edge and Endpoint IoT Devices", https://www.microsoft.com/en-us/research/project/resource-efficient-ml-for-the-edge-and-endpoint-iot-devices/, Accessed on Dec. 11, 2018, 3 pages.

(Continued)

*Primary Examiner* — Alan Chen
(74) *Attorney, Agent, or Firm* — Scully, Scott, Murphy & Presser, P.C.; Daniel P. Morris

(57) ABSTRACT

Determining cognitive models to be deployed at auxiliary devices may include maintaining relations, e.g., in a database. The relations map hardware characteristics of auxiliary devices and example datasets to cognitive models. Cognitive models are determined for auxiliary devices, based on said relations, e.g., for each of the auxiliary devices. An input dataset is accessed, which comprises data of interest, e.g., collected at a core computing system (CCS), and hardware characteristics of each of the auxiliary devices. An auxiliary cognitive model is determined based on a core cognitive model run on the input dataset accessed, wherein the core cognitive model has been trained to learn at least part of said relations. Parameters of the auxiliary model determined can be communicated to said each of the auxiliary devices for the latter to deploy the auxiliary model determined. Method may be implemented in a network having an edge computing architecture.

20 Claims, 5 Drawing Sheets

(56) References Cited

U.S. PATENT DOCUMENTS

| | | | | |
|---|---|---|---|---|
| 2016/0055426 | A1* | 2/2016 | Aminzadeh | G06N 20/00 706/12 |
| 2017/0006135 | A1 | 1/2017 | Siebel et al. | |
| 2017/0060574 | A1 | 3/2017 | Malladi et al. | |
| 2017/0091657 | A1* | 3/2017 | Kida | G06N 20/00 |
| 2017/0124486 | A1* | 5/2017 | Chan | G06N 20/00 |
| 2017/0220942 | A1* | 8/2017 | Baldini Soares | G06N 20/10 |
| 2017/0286861 | A1 | 10/2017 | Kelly et al. | |
| 2018/0012145 | A1 | 1/2018 | Maurya et al. | |
| 2018/0089572 | A1 | 3/2018 | Aili et al. | |
| 2018/0210427 | A1 | 7/2018 | Cella et al. | |
| 2020/0090075 | A1* | 3/2020 | Achin | G06N 20/00 |

OTHER PUBLICATIONS

Scheidegger, F., et al., "Efficient Image Dataset Classification Difficulty Estimation for Predicting Deep-Learning Accuracy", https://arxiv.org/pdf/1803.09588.pdf, Mar. 26, 2018, Accessed on Dec. 11, 2018, 10 pages.

Strate, R., et al., "TAPAS: Train-less Accuracy Predictor for Architecture Search", https://arxiv.org/pdf/1806.00250v1.pdf, Jun. 1, 2018, Accessed on Dec. 11, 2018, 9 pages.

Gupta, C., et al., "ProtoNN: Compressed and Accurate kNN for Resource-scarce Devices", Proceedings of the 34th International Conference on Machine Learning, 2017, http://proceedings.mlr.press/v70/gupta17a/gupta17a.pdf, Accessed on Dec. 11, 2018, 16 pages.

Han, S., et al., "Deep Compression: Compressing Deep Neural Networks with Pruning, Trained Quantization and Huffman Coding", https://arxiv.org/pdf/1510.00149.pdf, Feb. 15, 2016, Accessed on Dec. 11, 2018, 14 pages.

Kumar, A., et al., "Resource-efficient Machine Learning in 2 KB RAM for the Internet of Things", Proceedings of the 34th International Conference on Machine Learning, 2017, http://proceedings.mlr.press/v70/kumar17a/kumar17a.pdf, Accessed on Dec. 11, 2018, 10 pages.

Real, E., et al., "Large-Scale Evolution of Image Classifiers", https://arxiv.org/pdf/1703.01041.pdf, Jun. 11, 2017, Accessed on Dec. 11, 2018, 18 pages.

Parker, D., et al., "Winning share in automotive semiconductors", https://www.mckinsey.com/~/media/mckinsey/dotcom/client_service/semiconductors/issue%203%20autumn%202013/pdfs/5_automotivesemiconductors.ashx, Accessed on Dec. 11, 2018, pp. 34-41.

\* cited by examiner

AUTOMATIC DETERMINATION OF COGNITIVE MODELS FOR DEPLOYMENT AT COMPUTERIZED DEVICES HAVING VARIOUS HARDWARE CONSTRAINTS

BACKGROUND

The present application relates in general to computerized techniques for determining cognitive models to be deployed at computerized devices, e.g., in an edge computing and/or an Internet-of-Things environment. In particular, it is directed to methods taking into account hardware characteristics of such computerized devices, in order to tune the cognitive models to be deployed thereon.

The need for data-driven decisions and the availability of high-performance computing systems processing large amounts of data has largely contributed to the success of machine learning. Machine learning concerns a set of cognitive techniques to allow computerized systems (or other hardware devices) to learn from input data. Machine learning often relies on artificial neural networks (ANNs), which are computational models inspired by biological neural networks in human or animal brains. Such systems progressively and autonomously learn tasks by means of examples; they have successfully been applied to speech recognition, text processing and computer vision, amongst other examples. Many types of neural networks are known, starting with feedforward neural networks, such as multilayer perceptrons, deep neural networks and convolutional neural networks.

Cognitive models are usually implemented in software. Machine learning has been successfully applied to a variety of tasks, such as image classification, object detection, video analytics, text translation, etc.

In another technical field and with a different target in mind, edge computing architectures are notably used to optimize resources in cloud computing networks. With such an architecture, some data processing is performed at the edge of the network, i.e., close to where the data is, so as to reduce the network bandwidth consumption between edge devices and the core system. This way, analytics and data generation can be performed closer to the data source. Edge architectures may involve various technologies, such as wireless sensor networks, mobile data acquisition and signature analysis, mobile edge computing, peer-to-peer networking, local cloud/fog computing, grid/mesh computing, cloudlet, etc. Various cloud services may accordingly be designed, such as distributed data storage and retrieval, remote cloud services, etc.

Like other edge computing architectures, the Internet-of-Things relies on the deployment of a large number of small, inexpensive, power/resource-constrained computing nodes (which can be regarded as edge devices). Such edge devices generate streams of data that are processed locally and at the core of the system. A variety of types of edge device types can be involved (e.g., from mobile phones to industrial supervisory control and data acquisition systems), each having its own hardware constraints and compute capabilities. The edge workloads too may vary considerably.

In general, edge processing computing units are constrained in several respects, such as power consumption, computing performance, computing capability (e.g., limited support of number systems due to the lack of floating-point units or different non-standard number formats), volatile and non-volatile memory availability, operating systems and supported software environments.

The variety of computerized entities involved in such environments prevents (or at least seriously impairs) the automatic generation of cognitive models for deployment at such entities. Some methods of automatic generation of machine learning models may be difficult to implement in environments such as described above. For instance, they may rely on a dataset characterization and meta-machine learning to efficiently generate architecture searches and tune the models identified by the search to achieve relevant, deep neural networks for given data. However, such approaches implicitly address a single, high-performance type of appliance, basically running the search in an ideal, unconstrained way. That is, such approaches rely on the implicit assumption that no restriction exist in terms of memory and/or computational capability of the target device.

SUMMARY

According to a first aspect, the present invention is embodied as a computerized method for determining cognitive models to be deployed at auxiliary devices. The method involves a number of steps performed at a core computing system, or CCS. In one aspect, relations are maintained (e.g., in a lifelong database), wherein said relations map hardware characteristics of (i) auxiliary devices and (ii) example datasets to cognitive models. Cognitive models are determined for each auxiliary device, based on said relations. The models determined are referred to as auxiliary cognitive models. In detail, an input dataset is accessed, which comprises, on the one hand, focal data (i.e., data of interest for an auxiliary device, which data is collected at the CCS) and, on the other hand, hardware characteristics of each of the auxiliary devices. An auxiliary cognitive model is determined, for example, based on a core cognitive model run on the input dataset accessed. This core cognitive model has been trained to learn at least part of said relations. Parameters of the auxiliary model determined are communicated to each of the auxiliary devices for the latter to deploy the corresponding auxiliary model.

The present approach makes it possible to automatically determine suitable cognitive models for deployment on auxiliary devices. The process may possibly be achieved without any user input, subject to possible user constraints, e.g., in terms of performance to be achieved. Maintaining relations as described above makes it possible to readily serve requests, e.g., on the fly, while optimizing for multiple objectives. As such relations take various possible hardware characteristics into account, suitable cognitive models can be determined for (and possibly optimized with respect to) various types of auxiliary devices. Interestingly, this approach is not limited by the types of cognitive models that may be taken into account or the types of auxiliary devices. Various (all) types of cognitive models may be concurrently considered, for various types of devices, for instance, based on the maintained relations and a suitably trained, core cognitive model.

In one aspect, the auxiliary cognitive model is determined by generating (e.g., synthesizing) a cognitive model, based on outputs from the core cognitive model run on the input dataset accessed.

In embodiments, generating the auxiliary cognitive model comprises: identifying a candidate cognitive model, for example, based on the core model trained; and training the candidate cognitive model identified based on said focal data, taking into account resources for said each of the auxiliary devices as determined from said hardware characteristics.

In one aspect, the generation of an auxiliary cognitive model comprises emulating the auxiliary device, whereby an execution of the candidate model on this auxiliary device is simulated at the CCS.

Said candidate cognitive model may for instance be a neural network and identifying said candidate cognitive model may comprise identifying an architecture for this neural network, for example, based on the core model trained. In that case, the training of the candidate cognitive model may comprise quantizing weights of the neural network. Moreover, the auxiliary cognitive model may possibly be generated by taking into account an arithmetic compute capability of the auxiliary device, as determined from said hardware characteristics.

In some embodiments, the identification of the auxiliary model further comprises: determining a subset of the relations as maintained at the CCS (based on the input dataset accessed); and running the core cognitive model based on said subset of the relations, so as to identify the candidate cognitive model.

The core cognitive model may advantageously include a predictor, whereby running the core cognitive model comprises predicting, with said predictor, performances of multiple candidate cognitive models identified based on said subset of the relations.

In one aspect, the relations as maintained at the CCS capture levels of performances of the cognitive models mapped by said relations. Thus, the identification of the candidate cognitive model may further comprise training the predictor based on the subset of the relations determined, prior to predicting the performances of the multiple candidate cognitive models with said predictor.

Advantageously, the core cognitive model may further include an evolutionary algorithm such as a genetic evolution algorithm. This genetic evolution algorithm may thus be run (e.g., as part of running the core cognitive model) in order to identify a most suitable cognitive model out of the multiple candidate cognitive models, based on corresponding performances as predicted with the predictor. The genetic evolution algorithm may possibly take additional inputs, such as user constraints in respect of computational resources to be used by the genetic evolution algorithm.

In addition, the input dataset accessed may further comprise other user constraints in respect of the auxiliary cognitive model to be determined. In that case, the auxiliary cognitive model is determined (for each auxiliary device), thanks to the core cognitive model run based on each of the focal data, the hardware characteristics, and these other user constraints, as accessed for each auxiliary device.

In embodiments, the method further comprises, at each of the auxiliary devices, deploying an auxiliary cognitive model determined for said each of the auxiliary devices, for it to locally perform computations based on the deployed model.

In one aspect, the method further comprises: selecting hardware characteristics of auxiliary devices and example datasets; defining auxiliary cognitive models; and training the auxiliary cognitive models defined based on the selected hardware characteristics and example datasets to determine the relations subsequently maintained in the core system.

Said relations may be maintained in a database (e.g., a lifelong database). These relations may further be continually enriched by storing a new relation on said database, the new relation determined based on the auxiliary cognitive model determined for each auxiliary device.

The present methods may be implemented in a network comprising said CCS and said auxiliary devices, where the network has an edge computing architecture and the auxiliary devices are configured as edge computing devices of the network, wherein each of said devices is capable to be set in data communication with the CCS.

According to another aspect, the invention is embodied as a computerized system. Similar to the CCS described in respect of the above methods, this computerized system is configured to establish data communication with any device of a set of auxiliary devices and maintain relations mapping hardware characteristics of auxiliary devices and example datasets to cognitive models. Consistently with the present methods, said system is further configured to perform a number of operations, for each auxiliary device, e.g., to: access an input dataset comprising focal data and hardware characteristics of this device, determine an auxiliary cognitive model thanks to a core cognitive model run on the input dataset accessed, wherein the core cognitive model has been trained to learn at least part of said relations, and communicate parameters of the auxiliary model determined to this device for the latter to deploy the auxiliary model determined.

According to another but related aspect, the invention can be embodied as a computerized network having an edge computing architecture, the network comprising a core computing system, or CCS, according to the above computerized system, wherein the network further comprises one or more of said auxiliary devices, the latter configured as edge computing devices in data communication with the CCS.

According to yet another aspect, the invention is embodied as a computer program product for determining cognitive models to be deployed at auxiliary devices. The computer program product comprises a computer readable storage medium having program instructions embodied therewith, the program instructions executable by one or more processors of a core computing system, or CCS, to cause the latter to perform steps according to the present methods.

Computerized systems, networks, methods, and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. A cognitive model is denoted by "ML model" in these drawings. Similar or functionally similar elements in the figures have been allocated the same numeral references, unless otherwise indicated.

DETAILED DESCRIPTION OF EMBODIMENTS OF THE INVENTION

The following description is structured as follows. First, general embodiments and high-level variants are described (sect. 1). The next sections address more specific embodiments and technical implementation details (sect. 2 and 3).

1. General Embodiments and High-Level Variants

In reference to FIGS. 1-5, an aspect of the invention is first described, which concerns a computerized method for determining cognitive models. The present method and its variants are collectively referred to as the "present methods". Steps of the present methods are performed at a core computing system (CCS) 10. The CCS 10 includes one or more core computing devices 14, which may form part of a backend infrastructure 10 of a network 1, as in embodiments. Additional steps may be performed at the auxiliary devices. In one aspect, the models determined are meant to be deployed at the auxiliary devices 24, see FIG. 1. Such devices 24 may for example be of various types and thus involve different hardware characteristics, such as, e.g., a small single-board computer, field programmable gate arrays (FPGAs), application-specific integrated circuits (ASICs), microcontrollers, etc.

Note, in the literature, the terms "cognitive algorithm", "cognitive model", "machine learning model" or the like are often interchangeably used. This description makes no exception. However, in an effort to clarify terminologies, one may tentatively adopt the following definition: a machine learning model (ML model) is generated by a cognitive algorithm, which learns its parameter(s) from input data points (e.g., in a supervised or unsupervised way), so as to arrive at this model. Thus, a distinction can be made between: (i) a cognitive algorithm used to train a model; and (ii) the model that eventually results (the trained model) upon completion of the training.

Figure 5A:
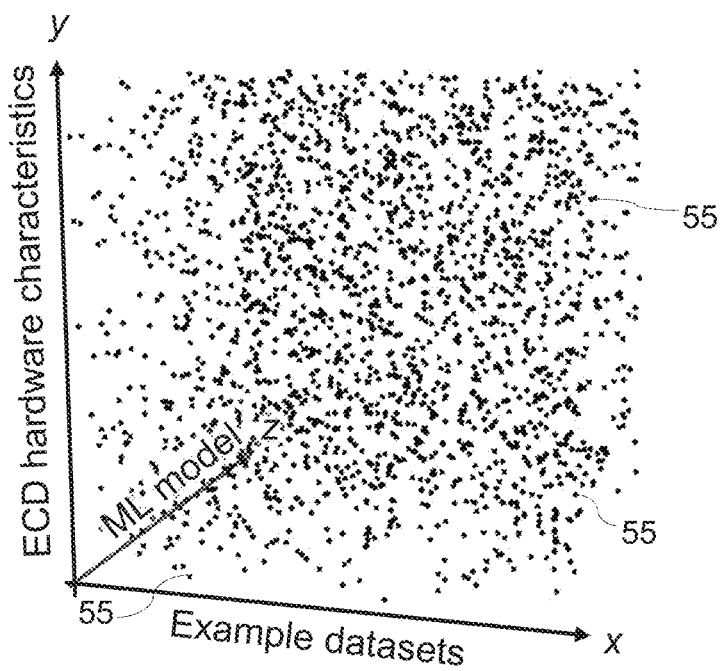
FIGS. 5A and 5B show 3D plots illustrating how relations maintained at the core system can be filtered, in order to accelerate the search and generation of auxiliary models, as involved in embodiments.

The present methods in embodiments include maintaining (steps S10, S25, FIG. 3) relations 55 that map hardware characteristics of auxiliary devices 24 and example datasets to cognitive models. Such relations link, each, hardware characteristics (e.g., arithmetic compute capabilities of the auxiliary devices, memory capacity or availability) and example datasets (images, tables, matrices, etc.) to cognitive models (or types of cognitive models), such as neural networks, linear regression models, random forests models, etc. Such relations may thus be regarded as a function that associates elements $\{x, y\}$ from the sets X, Y formed by the various example datasets (X) and hardware characteristics (Y) to one or more elements (models, or model types) z of the set Z of cognitive models, as illustrated in FIG. 5A. Such sets X, Y, Z are not closed; they can be extended as needed to accommodate new types of data, hardware characteristics and ML models. These relations may simply be of a binary type, to affix given cognitive models (types, architectures, etc.) to given example datasets and hardware characteristics of devices. The existence of such a relation for a given pair of elements $\{x, y\}$ translates as a dot in the 3D plot of FIG. 5A. In more sophisticated variants, though, such relations further indicate a level of performance of each cognitive model retained, to allow a predictor to be trained on the fly, as discussed later in reference to some embodiments. Such relations may for example be maintained in a lifelong database, which maintains a history of data and performance characteristics of the auxiliary devices 24 and models run thereon.

Moreover, the relations 55 may possibly capture additional factors. That is, the relations 55 may associate elements $\{x_1, x_2, x_3, \ldots\}$ from sets $X_1, X_2, X_3, \ldots$ to ML models, where the sets $X_1, X_2, X_3, \ldots$ include one or more additional sets $X_3, \ldots$ beyond the mere example datasets ($X_1$) and hardware characteristics ($X_2$). The additional factors may include user constraints, as discussed later in detail. Thus, in general, such relations 55 can be regarded as n-adic or n-ary relations, where $n \geq 3$.

In one aspect, based on said relations 55, a number of steps can be performed at the CCS 10, which aims at determining auxiliary cognitive models for the devices 24. Such steps are performed for each auxiliary device 24 (concurrently or one at a time), e.g., upon request from a device 24, an application running thereon, or a client 30 of this device. Such steps are now described in detail in respect to a given auxiliary device 24, it being understood that the same process may be concurrently or sequentially performed for several devices 24 of the network 1, i.e., devices that are in data communication with the CCS, be it continuously or intermittently.

Figure 3:
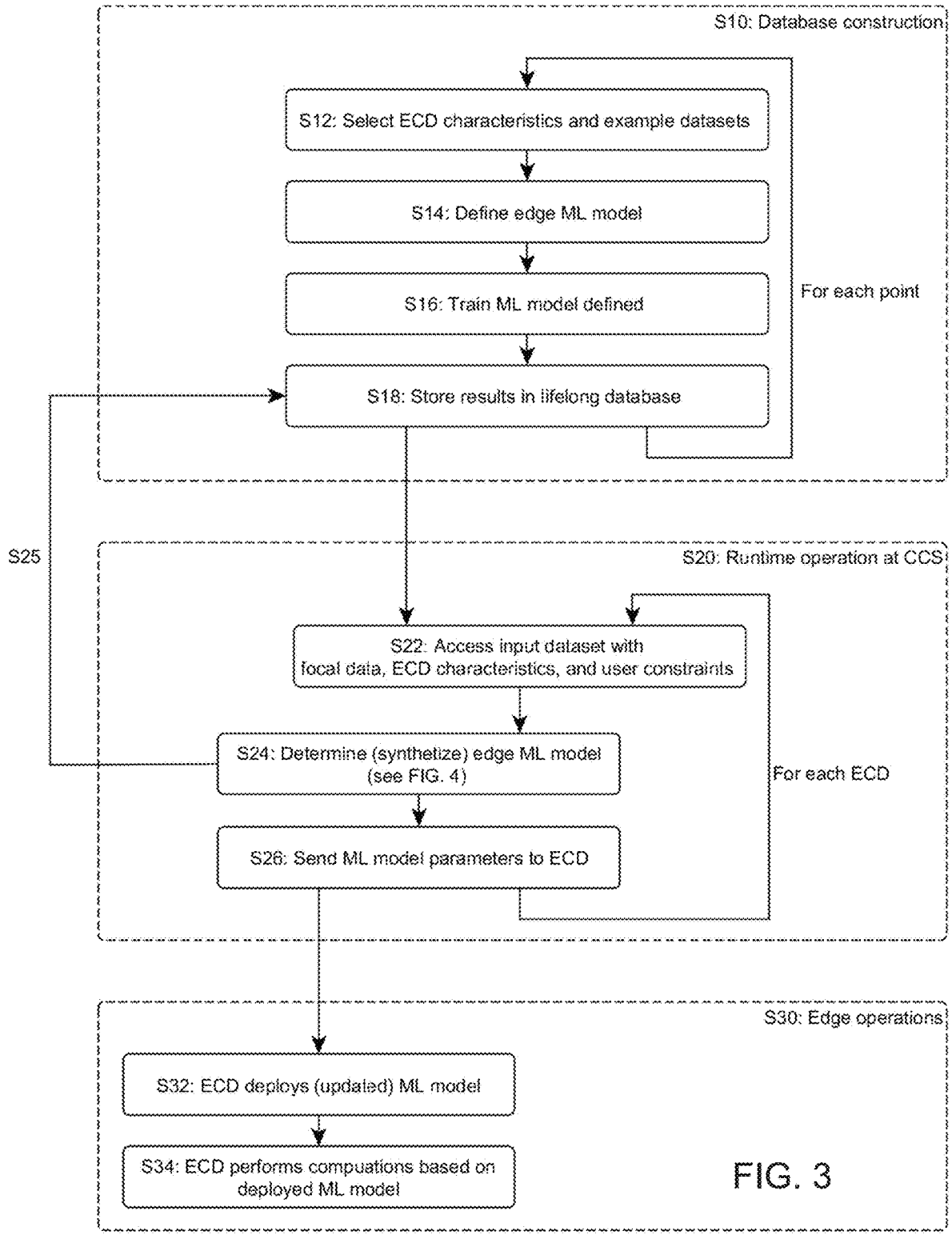
FIG. 3 is another flowchart, illustrating different phases of such a method, the phases which may include: (i) the database construction (for storing and maintaining relations needed for determining the cognitive models); (ii) the determination of the auxiliary cognitive models; and (iii) the subsequent deployment of the models at the edge devices, as in embodiments.

In one aspect, an input dataset 50 is accessed at the CCS 10, see step S22, FIG. 3. This dataset comprises data of interest (here referred to as "focal data") 51, which are collected (or somehow received or accessed) S21 at the CCS, as well as hardware characteristics 52 of said given auxiliary device 24.

Focal data is data of interest for this auxiliary device 24; it may for instance be user data or application data, or any data conveyed in the network 1, which is likely to be processed (consumed, produced) by this auxiliary device or otherwise relevant to it. One expects such focal data to bear some resemblance with one or more of the example datasets used to establish said relations in practice. The input dataset 50 accessed may for instance include data collected via said given auxiliary device 24 and forwarded by the latter to the CCS 10 (e.g., via a gateway 15). In variants, focal data may be received via any other channel (e.g., via the Internet, File Transfer Protocol (FTP), etc.) in the network 1 or other computerized means.

The hardware characteristics accessed S22 capture technical features, limitations, capacities, etc., of the device 24. Such characteristics may notably be provided as a device abstraction, e.g., in the form of a textual description of the device, which may be analyzed by a computational linguistic tool and translated into a set of specifications, readily understandable by a core cognitive model as described below. The description may even be orally captured, initially, before being translated into text, using text-to-speech.

An auxiliary cognitive model is determined S24 (again, for said given device 24), e.g., thanks to the core cognitive model. Note, the terminology "auxiliary [ . . . ] model" refers to cognitive models meant for the auxiliary devices, whereas the terminology "core [ . . . ] model" refers to a cognitive model run at the core system 10. The core model is run (see steps S244-S246 in FIG. 4) on the input dataset 50 accessed at step S22. That is, this core model takes the input dataset 50 as input.

The core model is assumed to have been trained S242 in due course, so to have learned at least part 55s of said relations 55. The core model may for example be trained upon completing the database construction and retrained (e.g., periodically) as necessary, to account for database updates. Best, however, is to train the core model on the fly, e.g., upon request from an auxiliary device, based on a filtered subset of the relations 55, to speed up the process. In all cases, the core model is assumed to have learned S242 at least part 55s of the relations 55 maintained, prior to being run at steps S244-S246.

The core cognitive model is thus trained and run at the CCS 10. Accordingly, when feeding the core model with dual inputs, i.e., focal data 51 and hardware characteristics 52 (each pertaining to said given device 24), the core model can infer (e.g., predict, classify, or otherwise identify) a suitable cognitive model for said given auxiliary device. Examples of suitable core models are later discussed in detail.

Once a suitable auxiliary model has been determined S24, parameters of this auxiliary model are communicated S26 to said given auxiliary device 24 for the latter to deploy S32 a corresponding ML model. The parameters can be communicated via any suitable channel to the auxiliary devices, see FIG. 2 for an illustration.

In one aspect, the above steps are performed at the CCS 10, in view of deploying S32 auxiliary models at the auxiliary devices 24, for them to locally perform (i.e., start or resume) S34 computations according to the deployed models. Deploying a new model at a given auxiliary device may simply amount to implement an updated ML model based on the parameters received, for this the auxiliary device 24 to start (or resume) computations according to the updated ML model. Still, depending on the case, a new type of ML model may be deployed S32, or a ML model may be deployed for the first time.

Thus, the present methods may, in embodiments, include additional steps that are concurrently performed at the auxiliary devices 24, starting with the deployment S32 of the cognitive models and computation S34 therewith, whereby data is processed at the devices 24 thanks to the cognitive models deployed. Additional steps may possibly be performed at the devices 24, such as collecting S21 data for providing feedback to the database, in order to aggregate S25 new relations. Steps S30 (third phase) performed at the devices 24 will typically be at least partly concomitant with steps S20 (second phase) performed at the CCS 10 and steps S25 aiming at aggregating new relations, as reflected in FIG. 2. The first phase S10 concerns the initial build-up of relation 55, which need be performed prior to starting the second phase S20.

Figure 1:
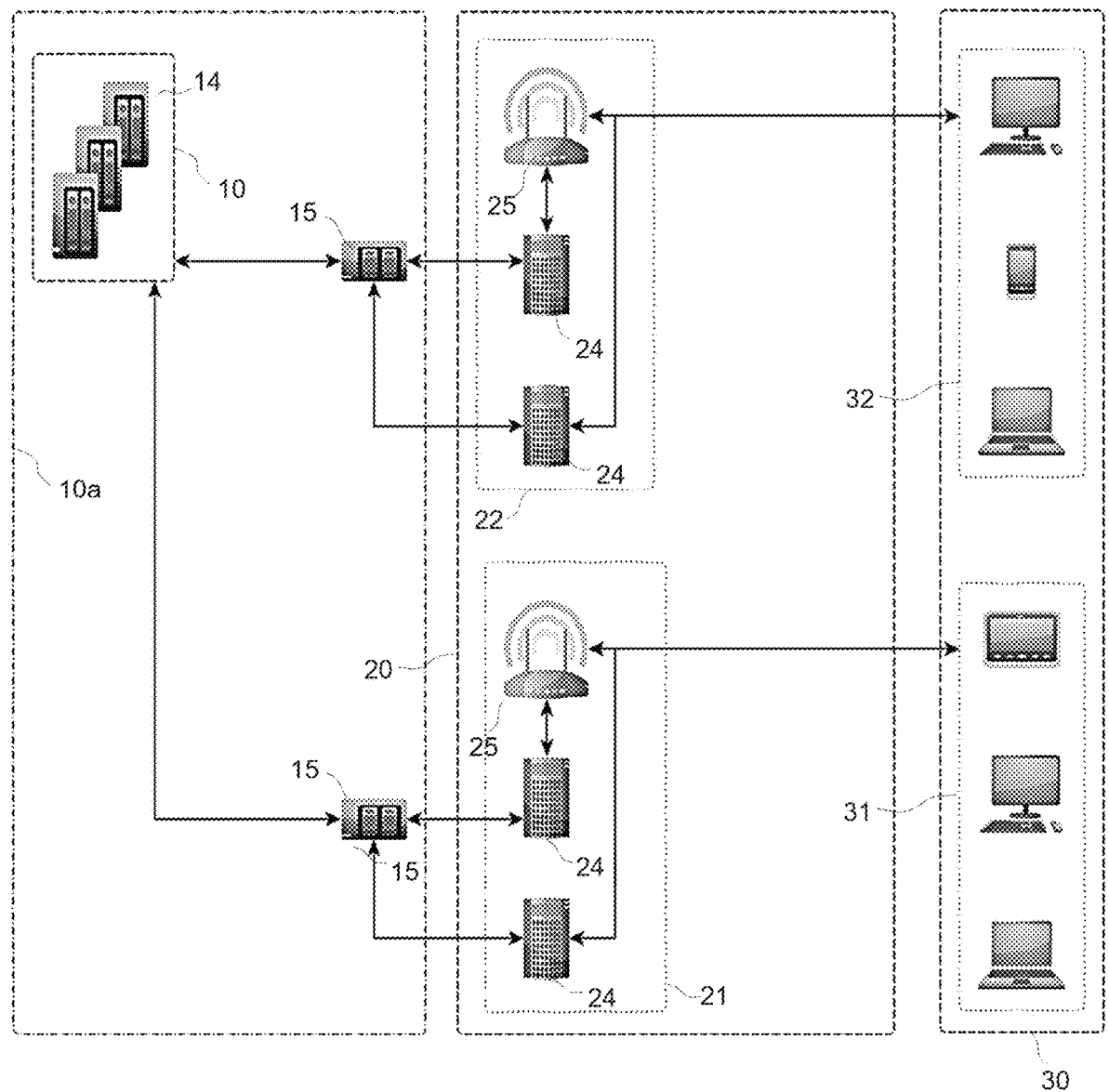
FIG. 1 schematically represents a network having an edge computing architecture, wherein a set of edge computing devices are in data communication with a core computing system in embodiments. Distinct groups of clients are shown to interact with respective groups of edge devices, which themselves interact with core devices of the core system via gateways, as in embodiments of the invention.

The present methods may be implemented in an edge computing environment, as assumed in the following, for the sake of illustration. Such methods can be implemented in a computerized network 1 having an edge computing architecture, wherein the network 1 comprises the CCS 10 and auxiliary devices 24, the latter configured as edge computing devices (ECDs) 24 of the network 1, as illustrated in FIG. 1. The devices 24 can be set, each, in data communication with the CCS 10, continuously or intermittently (and not necessarily all at the same time).

Such an architecture may be used to optimize resources in cloud computing networks. That is, some data processing can be performed at the edge of the network 1, i.e., close to where the data is, so as to reduce the network bandwidth consumption between edge devices 24 and the core system 10. This way, analytics and data generation can for example be performed closer to the data source 30. The present edge architectures may involve various technologies, e.g., wireless sensor networks, mobile data acquisition and signature analysis, mobile edge computing, peer-to-peer networking, local cloud/fog computing, grid/mesh computing, cloudlet, etc. Various cloud services may accordingly be designed, such as distributed data storage and retrieval, remote cloud services, etc., which may involve aspects of the present invention. In particular, the CCS 10 and the devices 24 may be configured in, or to work for an Internet of Things (IoT) environment.

The present approach makes it possible to automatically determine suitable cognitive models for deployment on auxiliary devices 24. The process may possibly be achieved without any user input at all, subject to possible constraints 53, 54, e.g., in terms of performance to be achieved or resources to be allocated for determining such models. Maintaining relations as described above makes it possible to readily serve requests, e.g., on the fly, while optimizing for multiple objectives. That is, the present approach takes into account hard constraints imposed by the auxiliary devices, beyond the sole data to be processed. And as the relations maintained take various possible hardware characteristics into account, suitable cognitive models can be determined for (and optimized with respect to) various types of auxiliary devices 24. Of remarkable advantage is that this approach is not limited by the types of cognitive models that may be taken into account nor the types of auxiliary devices. Namely, various types of cognitive models may be concurrently considered, for various types of devices. By construction, the variety of models and devices that can be accounted for by the present methods may expand over time.

In addition, the present methods may incorporate further constraints imposed by the users, if necessary. Moreover, an optimization strategy can be implemented, which allows the cognitive models to be tuned in respect to given hardware constraints. The tuning of the ML models may for example include weight compression, precision tuning, and architecture search.

All this is now described in detail, in reference to particular embodiments of the invention. To start with, in one aspect, step S24 can be carried out so as to generate (i.e., synthesize) an auxiliary cognitive model based on outputs from the core cognitive model run S244-S246 on the input dataset 50 accessed. The number of "experiments" conducted S10 (see FIGS. 3 and 5) to construct the database, albeit large, may be insufficient to find an exact (or even close) match to each situation in practice. Thus, it may be of advantage to generate a new cognitive model, instead of selecting a closest model.

In simpler variants, however, the auxiliary model may be determined at S24 as a closest fitting model (e.g., as per a classification process), based on outcomes from the core cognitive model. For example, an auxiliary model may be determined by running the core model on the input dataset 50, to allow relations to one or more types of auxiliary models to be identified and, from this, to select a closest candidate model. Such variants, however, may include maintaining a larger number of relations to provide results comparable to a model generation process as described below.

Figure 4:
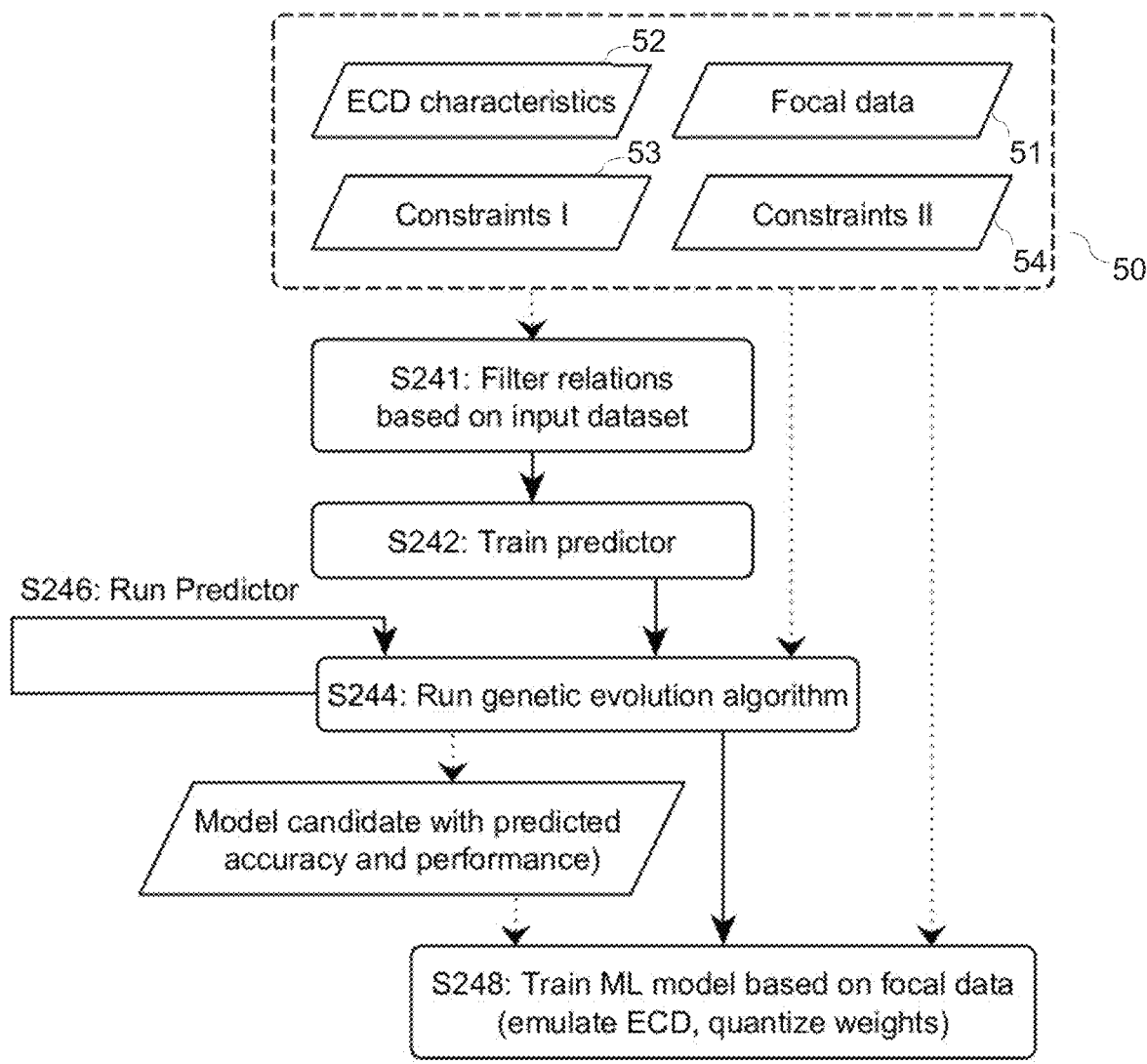
FIG. 4 is a flowchart illustrating detailed steps as preferably involved in the generation of new cognitive models, in embodiments.

Referring more specifically to FIG. 4, the model generation (i.e., synthesis) S24 may advantageously be achieved by identifying at S241-S244 a candidate cognitive model (thanks to the core model) and then training S248 the candidate cognitive model identified, based on said focal data 51. The training can take into account resources for the auxiliary device 24 as determined from its hardware characteristics 52. In one aspect, each of the focal data 51 and the hardware characteristics 52 serve twice in this example: a first time for determining a suitable model (or type of model), and a second time for training the model determined.

A candidate model may for example be a neural network, having a given architecture. That is, steps S241-S244 may aim at identifying a suitable architecture for this neural network, which then may be trained based on the input dataset 50. Note, in variants, other types of auxiliary models may be considered as well, e.g., linear regressions, random forests, gradient boosting, decision trees, nearest neighbors, etc. The present approach can be particularly effective for searching through various potential neural network architectures, which is particularly difficult with prior art methods.

The generation S24, in one aspect, can be achieved by emulating the auxiliary device 24. That is, the execution of the candidate model (as it would occur at the device 24) is simulated at the CCS 10. Emulating the auxiliary device makes it possible to more accurately train the auxiliary model in view of the target device 24 as hardware limitations from the latter are directly taken into account via the emulation. In other words, emulating the target device 24 prevents biasing the training. In one aspect, the emulation may possibly be performed prior to the training S248 (so as to fix constraints to the training), or after the training S248 (for checking purposes). Another aspect is to continuously emulate the target device during the training S248, e.g., so as to constantly take into account limitations of this device 24 during the training steps of the auxiliary model.

If the cognitive model considered is a neural network, then the training step S248 may for example impose a quantization of the connection weights of the neural network (the synaptic weights that adjust as learning proceeds). Beyond quantization, the training S248 of the neural networks may involve weight compression, e.g., as part of the emulation, to reduce the memory footprints and speed up the generation S24.

Auxiliary cognitive models may further be generated by taking into account arithmetic compute capabilities of the auxiliary devices 24 (e.g., again, while emulating the latter). Arithmetic compute capabilities can be determined from the hardware characteristics 52 accessed at step S22. For example, the present methods may implement low-precision arithmetic to compress weights and to emulate, on the CCS 10, bit true behavior of low-precision computations as they would subsequently occur at the target 24.

In one aspect, beyond arithmetic compute capabilities, other resources of the devices may possibly be taken into account during the training S248 of the candidate model, such as memory and computational resources, as well as power consumption of the auxiliary devices, for example.

Figure 5B:
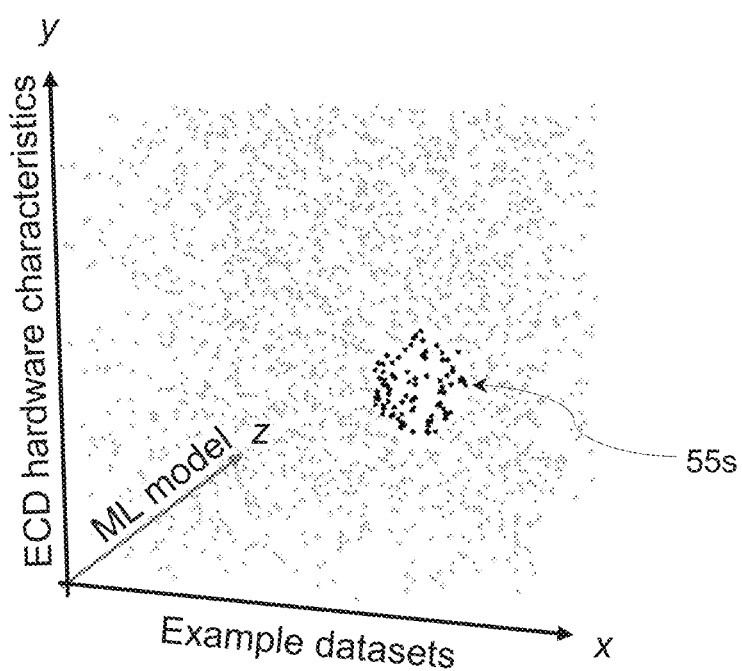

Referring more specifically to FIGS. 4 and 5, embodiments are now discussed, which allow particularly efficient (and thus fast) implementations to be achieved. Such embodiments rely on filtering the relations space (compare FIGS. 5A and 5B). In detail, the identification S241-S244 process may, for example, first, impose to determine S241 a subset 55s of the relations 55 maintained at the CCS 10. This filtering can be achieved thanks to the input dataset 50 accessed S22, using any suitable method (e.g., relying on keywords, selection rules, or again a trained machine learning model). Accordingly, the core cognitive model may be solely run S244-S246 based on the determined subset 55s of relations, so as to more efficiently identify S244 a candidate cognitive model.

Moreover, the core cognitive model may include a predictor. Thus, the core cognitive model may be run S244-S246 so as to predict S246 performances of multiple candidate cognitive models identified at step S244, thanks to said predictor, and based on said subset 55s of the relations 55.

As evoked earlier, the relations 55 maintained in the CCS 10 may, in some embodiments, further capture a level of performance of the cognitive models mapped by said relations. Thus, several potential models may possibly be mentioned in respect of given example datasets and hardware characteristics, wherein such models have respective levels of performance associated therewith. E.g., numerical values may be associated to the ML models (on the corresponding axis z), which may for example vary between 0.00 and 1.00, where 0.00 denotes a fully unsatisfactory model, while 1.00 indicates a fully satisfactory model. Thus, the dots shown in FIG. 5 may actually represent numeric values associated to the models. The levels of performances captured by the relations 55 can be regarded as ratings of the ML models (in respect to given focal data and hardware characteristics), which allows the predictor to be trained, e.g., on the fly. Thus, the identification process S241-S244 may further comprise a step of training S242 the predictor, based on the restricted subset 55s of relations 55 identified at step S241. As the number of relations has already been filtered S241 at this point, the training can be very fast. Once trained, the predictor can be run to predict S246 performances of multiple candidate cognitive models. This, together with the filtering step S241, makes it possible to efficiently, albeit accurately, identify a suitable model, e.g., on the fly, upon request from any device 24, application or client thereof.

As further seen in FIG. 4, the core cognitive model may further include a genetic evolution algorithm, in addition to the predictor. I.e., running S244-S246 the core cognitive model may thus involve running S244 this genetic evolution algorithm, together with the predictor, in order to identify a candidate cognitive model from multiple candidate cognitive models, using performances predicted by the predictor as a further selection means. A genetic evolution algorithm turned out to provide very satisfactory results in practice, especially when applied to neural network architecture searches. Still, other algorithms may be involved, which may for example consist in randomly preselecting S244 various candidate models. In other variants, potentially suitable models may be preselected thanks to a trained classifier, for example. In all cases, multiple candidates may be initially inferred, which are then selected thanks to the predictor.

For example, a coarse-grained architecture search may first be performed S244 to explore the full solution space. Still, in order to accelerate the search, a predictor may be used to predict S246 outcomes from various potential architectures, instead of having to train S248 them all from scratch, whence benefits in terms of efficiency and thus speed.

In one aspect, the algorithm run at step S244 (be it a genetic evolution algorithm or any other preselection algorithm) may further take user constraints 53 as input, where such constraints set limits in respect to computational resources to be used S244 by this algorithm. Such user constraints may for instance relate to hardware resources allocated (e.g., number of GPUs, memory) or algorithmic resources used on the CCS 10 at step S24 (e.g., number of iterations allowed at steps S244-S246, maximum time allowed for the identification, etc.). Such user constraints may for example originate from users of devices 30 interacting with the auxiliary devices 24 or from the CCS (e.g., from an administrator). Taking such constraints into account makes it possible to confine the search.

Other user constraints may be involved. For example, the input dataset 50 accessed at step S22 may include additional constraints 54 in respect of the auxiliary cognitive model to be determined. These additional constraints may thus be read by the core cognitive model and taken into account to restrict the search (e.g., filter the relations or restrict the potential candidate models). Such constraints 54 differ from the previous constraints 53, inasmuch as they concern performance to be achieved with the auxiliary devices, rather than computational resources allocated for the search. For example, these additional constraints 54 may force the core model to identify an affordable solution for a given type of device 24, owing to power consumption resources available, and/or computational time allowed, etc.

Thus, one understands that the present methods can possibly be made multi-objective aware and, in particular, may optimize for various constraints, e.g., to reduce power consumption or reduce time latency when deploying the auxiliary models at the auxiliary devices.

Figure 2:
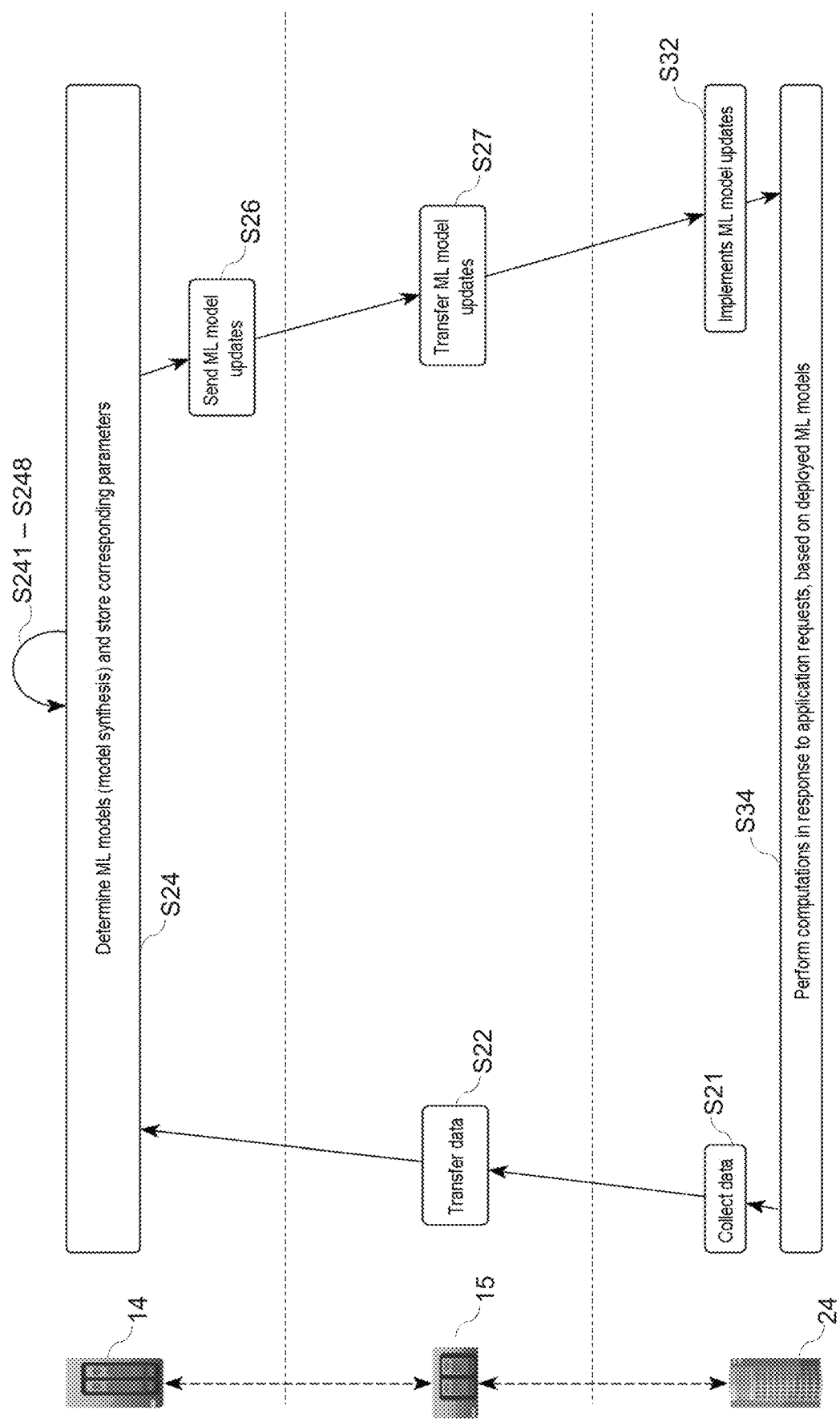
FIG. 2 is a flowchart showing selected steps of a method for determining auxiliary cognitive models to be deployed at edge devices of a network such as depicted in FIG. 1, according to embodiments. This flowchart shows concurrent steps performed at the core system and at an edge device, at runtime.

Steps performed at the CCS 10 have been discussed. As illustrated in FIGS. 2 and 3, the present method may, in embodiments, further involve steps performed at the auxiliary devices 24, starting with steps S32 and S34. That is, each auxiliary device 24 may deploy S32 a cognitive model, upon receiving parameters of this cognitive model as determined S24 for this device 24. Next, this device 24 may locally perform (or resume) S34 computations based on the newly deployed (or updated) model. Note, the models deployed at the auxiliary devices may possibly be re-trained (e.g., periodically or upon a sudden change in the data processed or in the context in which such data are processed). Thus, computations at the auxiliary devices 24 may be paused and resumed after updating the local model or after deploying a new type of model.

At present, more shall be said about the build-up of the relations 55 (first phase S10). Several techniques may be contemplated to aggregate the relations 55, including manual or half-automatized techniques. An embodiment is to systematically and automatically test various cognitive models for various sets of data and various hardware features (possibly augmented with various types of constraints 53, 54), as illustrated in FIG. 3. For example, the present methods may comprise selecting S12 various hardware characteristics 52 of given auxiliary devices and example datasets as routinely used by such devices. Various cognitive models may also be defined S14, which can then be trained S16 based on the selected S12 hardware characteristics 52 and example datasets, in order to determine said relations 55. Additional (validation) tests may further be performed to assess a level of performance for the models trained, which levels can be stored as part of said relations 55. The process S12-S16 may again include an emulation of the auxiliary devices 24. This way, the cognitive models are assessed in respect of performances they would effectively have on the target devices 24, it being reminded the distinct hardware limitations that such devices 24 may have. The relations 55 accordingly determined can then be stored S18, e.g., in a lifelong database, and be maintained thereon as long as necessary for the purpose of implementing the second and third phases S20, S30.

As noted earlier too, the initial collection of relations 55 may advantageously be enriched as the process goes on. Indeed, new relations can be determined on the basis of new auxiliary cognitive models determined at step S24. Thus, in addition to the initial relations maintained S10 in the database, new relations as determined from step S24 can be continually stored S25 on this database, to enrich the latter. In addition, feedback may be collected S21, S22 from the auxiliary devices 24 to rate the performance of the models deployed at step S32. This helps in determining S244-S246 new auxiliary models, and so on. Note, owing to the above enrichment process, a growing variety of datasets will be accounted for in the database, leading to a convergence between focal data 51 continually accessed at step S22 and the example datasets stored S18, S25, subject to new types of datasets that appear from times to times. Still, efficient search algorithms as discussed earlier in reference to FIG. 4 will not substantially suffer from the expansion of the database.

Referring more specifically to FIGS. 1 and 2, another aspect of the invention is now discussed, which concerns a computerized system 10, such as the CCS 10 discussed above in detail. As the main features of this system 10 have already been described in detail, in reference to the present methods, this system 10 is only briefly described in the following. As said, the system 10 may comprise one or more computing devices 14. Essentially, such a system 10 is configured (designed, programmed, etc.) to establish data communication with any device of a set of auxiliary devices 24. The system 10 further needs to maintain relations 55 as discussed earlier, i.e., such relations map hardware characteristics 52 of auxiliary devices 24 and example datasets (possibly user constraints too) to cognitive models. Moreover, the system 10 is designed to access (for each device 24) an input dataset 50 with focal data 51 and hardware characteristics 52 of such a device 24, in order to determine a suitable cognitive model, thanks to the core cognitive model run S244-S246 on the system 10. Eventually, the system 10 may communicate parameters of any auxiliary model it determines S24 to a relevant device 24 for the latter to deploy this model.

A further aspect of this invention concerns a computerized network 1, see FIG. 1, which has an edge computing architecture. This network 1 is equipped with a system (CCS) 10 as described above, and further includes one or more auxiliary devices 24. Such devices are configured as edge computing devices (ECDs) 24, which can all be set in data communication with the CCS 10, e.g., intermittently and not necessarily all at the same time. The ECDs may for instance be configured to work in an Internet-of-Thing environment 20, 30.

Various architectures can be contemplated. The example of FIG. 1 assumes that several groups 31, 32 of client devices 30 (which could be mere sensors, notwithstanding the depictions used in FIG. 1) communicate with the auxiliary devices 24 (e.g., wirelessly via routers 25). Distinct groups 31, 32 of clients may possibly interact with respective groups 21, 22 of auxiliary devices, which themselves interact with core computing devices (CCDs) 14 of the CCS 10 via gateways 15. The latter may be considered to form part of a core infrastructure 10a, together with the core devices 14. The core computing is nevertheless ensured by CCDs 14.

Embodiments as illustrated in FIG. 2 involve various steps performed at the auxiliary devices 24, the gateway 15 and the CCDs 14. Note, the gateways are optional as the steps they perform may be carried out partly at the auxiliary devices and partly at the CCDs. Relying on gateways is nevertheless preferred inasmuch as this allows different types of network segments using different communication protocols to be interfaced and bandwidth consumption to be saved. Yet, the gateways 15 could in fact restrict to mere bridges if similar network segments were involved.

The network 1, in one aspect, comprises a database, e.g., a lifelong database, in data communication with each of the auxiliary devices 24. The database stores relations 55 determined during the build-up phase S10. This database may further be configured to collect S21, S22 data from the auxiliary devices 24. The collected data may notably include results from the models run S34 on the auxiliary devices 24, in order to enrich the relation pool, as discussed earlier. In the example of FIG. 1, said database is assumed to be implemented at (and stored on) one or more of the core computing devices 14.

Additional aspects of the core system 10, the auxiliary devices 24, and other computerized entities that may possibly be involved in the present networks 1 are discussed in section 3.1.

According to another aspect, the invention may be embodied as a computer program product for determining cognitive models to be deployed at auxiliary devices, according to the present methods. That is, the computer program product comprises a computer readable storage medium having program instructions embodied therewith, wherein such program instructions are executable by one or more processors of the CCS 10, to cause the latter to perform steps according to the present methods. Note, these program instructions may be augmented with additional instructions, meant to execute on the auxiliary devices 24, e.g., for the purpose of deploying the models, performing computations therewith, collecting result therefrom, etc. Additional aspects of such computer program products are discussed in section 3.2.

The above embodiments have been succinctly described in reference to the accompanying drawings and may accommodate a number of variants. Several combinations of the above features may be contemplated. Examples are given in the next section.

2. Specific Embodiments

This section describes a system that can optimize machine learning (ML) models, for example, deep neural networks, to satisfy strict hardware constraints for the target devices. Meeting such constraints can allow for deploying a ML model in special-purpose device, such as an edge device in an Internet-of-Thing (IoT) environment. The disclosed system may be applied to smart grids, smart homes, power plants (e.g., solar, wind and geo-thermal power plants), manufacturing, robotics, communications, consumer goods, healthcare, and autonomous transportation such as self-driving cars and drones.

This system is able to address real-world issues that occur when applying machine learning on edge devices. Multi-objective and constraint-aware tuning mechanisms as discussed in the previous section make it possible to find solutions to the following use cases: "What is the most accurate model I can execute on a device that has IEEE 754 floating point support, a low-end single central processing unit, and is limited to 300 MB of main memory?", "What is the energy/accuracy tradeoff of all deep neural networks that I can fit on my device?", "What is a the most accurate prediction I can get when trying to solve a problem in regular intervals of 5 minutes on a low-cost memory controller that is restricted to 16 bit integer arithmetic, 16 MHz operation frequency and has 10 KB of memory?", "In the latter case, what is the power tradeoff? Can I switch models to guarantee a minimum operation lifetime when operating with a battery of limited capacity?", "How long does one inference step of my model take on the edge device?", "How much power/energy is used during that period?", "How long will the battery of the supply last to perform that operation?", etc.

The system involves computerized methods as described in sect. 1, which allow efficient deep neural architecture searches and enable the deployment of ML solutions on edge devices such as used in an IoT environment. The methods include hardware constraints for such devices into the optimization procedure, such as power consumption, computing performance and capability, volatile and nonvolatile memory availability, operating systems, other hardware constraints (e.g., deploying the model on field programmable gate arrays, limited in blocks and lookup tables), and supported software environments. Beyond the hardware constraints, the optimization algorithm is multi-objective aware and can optimize for additional user constraints. For example, a user might want to impose budgets in terms of time per inference, power or energy consumed per inference, or inference throughput and latency constraints.

The multi-objective formulation allows full Pareto, optimal front of solutions to be generated, for example to evaluate operation lifespan limited due to battery constraints against predictive accuracy during the operation lifetime of the device.

The approach chosen is general in its applicability. The same procedure can be used to develop a model to run on a set of various potential IoT edge devices, including FPGAs, low-end computer systems, microcontrollers or ASICs. This approach is further multi-objectives. In contrast to known methods, the present methods can be tailored to map (and optimize) neural networks on IoT devices with very limited resources. Since the present methods further make it possible to optimize for different devices automatically, they allow the development cycle of applications to be shortened.

In detail, this system includes two main components, the core computing system (the backend infrastructure) 10 and the edge devices 24, which might, e.g., be operated autonomously, with limited power, energy and compute capability constraints. The backend infrastructure implements and runs the search, optimization and tuning procedure S24 (S241-S248) to obtain a fitting ML solution for an edge device. The backend system 10 may for example be a usual personal computing device (e.g., a workstation or a laptop, which may possibly include GPUs), a high-performance computing infrastructure (e.g., an IBM Power8 or Power9 system, possibly equipped with GPUs), or, still, a private, semi-private or public Cloud infrastructure such as provided by International Business Machines Corporation (IBM) or other companies. IBM is a corporation headquartered in Armonk, N.Y., United States.

The edge devices may for example include computing systems such as the Raspberry Pi system, embedded devices, standard micro-controllers or customized field-programmable gate arrays (FPGAs), Application-Specific Integrated Circuits (ASICs), etc. A device abstraction that contains characteristics that are relevant for the optimization can be accessed at runtime (step S22, FIG. 3). This abstraction may include a description of the compute capability supported on the device, such as the availability and support of IEEE 754 32 bit or 64 bit arithmetic, support for integer and fix-point arithmetic, the amount of available memory, and/or the characterization of compute performance of the device. A user may further define and provides a description of an optimization target that reflects the optimization goal in terms of constraints, and a list of parameters that should be optimized. Additional constraints may be provided, such as memory constraints that are more stringent than the hardware constraints described in the device abstraction. Such additional constraints may reflect the fact that the device should run multiple tasks in parallel, such that the optimized neural network model will only get a fraction of the available resources for its operation.

The backend involves a program that implements computerized methods such as disclosed herein, which take focal data, the device abstraction, and a description of the optimization target from the user, in order to perform and generate specific ML solutions for the edge devices.

Internally, the optimization procedure, in one aspect, operates with the following components: a life-long database, which stores relations 55 capturing, e.g., previously ingested S10, S25 experimental knowledge and device abstractions, specific emulated implementations (that simulate how parts of the model can execute on the edge device, while the actual simulation is running on the backend infrastructure), and optimization algorithms. The latter may for instance force to satisfy any one or more of the following goals:

Meeting given constraints from the device abstraction,
Meeting additional user constraints,
Reading and accessing the lifelong database to extract and ingest historical knowledge into the optimization process,
Reading the users ground-truth data to extract characteristics (such as ProbeNets runs or high-level metadata),
Reading users data to train and evaluate a set of models,
Optimize user-given target according the optimization target description, and
Generate a pareto-optimal front of solutions for multi-objective defined tasks.

The optimization algorithm involved at step S244 may notably involve a genetic evolution algorithm, a brute-force algorithm on a limited set of experiments, or a hyperparameter optimization algorithm such as the so-called grid search, random search, Bayesian optimization or Hyperband optimization algorithms.

As disclosed above, a computerized method of determining cognitive models to be deployed at auxiliary devices may include a number of steps that are performed at a core computing system (CCS). For instance, relations are maintained, e.g., in a lifelong database, wherein said relations map hardware characteristics of auxiliary devices and example datasets to cognitive models. Cognitive models are determined for auxiliary devices, based on said relations and, this, for each of the auxiliary devices. For instance, an input dataset is accessed, which comprises, on the one hand, data of interest (called focal data), collected at the CCS, and, on the other hand, hardware characteristics of said each of the auxiliary devices. Then, an auxiliary cognitive model is determined thanks to or based on a core cognitive model run on the input dataset accessed, wherein the core cognitive model has been trained to learn at least part of said relations. Parameters of the auxiliary model determined can be communicated to said each of the auxiliary devices for the latter to deploy the auxiliary model determined. This method may be implemented in a network having an edge computing architecture. Related computerized systems (and, in particular, e.g., networks), and computer program products may be provided.

3. Technical Implementation Details: Computerized Entities and Computer Program Products Computerized entities can be suitably designed for implementing embodiments of the present invention as described in sect. 1 and 2. In that respect, it can be appreciated that the methods described herein are at least partly non-interactive, i.e., automated. Automated parts of such methods can be implemented in software, hardware, or combinations thereof. In exemplary embodiments, automated parts of the methods described herein are implemented in software, as a service or an executable program (e.g., an application), the latter executed by suitable digital processing devices.

For instance, each of the computerized entities 14, 15, 24, and 30 shown in FIG. 1 may include or consist of a computerized unit (a computer, a computerized device or an assembly of such devices, in data communication), which includes one or more processors and a memory (possibly including several memory units) coupled to one or memory controllers. Each processor is a hardware device for executing software, as e.g., loaded in a main memory of the device. A processor, which may in fact comprise one or more processing units, can be any custom made or commercially available processor.

The memory can include a combination of volatile memory elements (e.g., random access memory) and non-volatile memory elements, e.g., a solid-state device. The software in memory may include one or more separate programs, each of which comprises an ordered listing of executable instructions for implementing logical functions. For example, the software in the memory includes methods described herein in accordance with exemplary embodiments and a suitable operating system (OS). The OS essentially controls the execution of other computer (application) programs and provides scheduling, input-output control, file and data management, memory management, and communication control and related services. It may further control the distribution of tasks to be performed by the processing units.

The methods described herein shall typically be implemented (at least partly) in the form of an executable program, a script, or, more generally, any form of executable instructions, e.g., in a compiled or interpreted form.

Any computerized unit may further include a display controller coupled to a display. In exemplary embodiments, a computerized unit further includes a network interface or transceiver for coupling to a network (not shown). In addition, such a computerized unit may typically be interfaced with one or more input and/or output (I/O) devices, or peripherals that are communicatively coupled via a local input/output (I/O) controller. A system bus interfaces all components. Further, the local interface may include address, control, and/or data connections to enable appropriate communications among the aforementioned components. The I/O controller may have additional elements, which are omitted for simplicity, such as controllers, buffers (caches), drivers, repeaters, and receivers, to allow data communication.

When such a computerized unit is in operation, one or more processing units executes software stored within the memory of the computerized unit, to communicate data to and from the memory and/or the storage unit (e.g., a hard drive and/or a solid-state memory), and to generally control operations pursuant to software instruction. The methods described herein and the operating system (OS), in whole or in part are read by the processing elements, typically buffered therein, and then executed. When the methods described herein are implemented in software, the methods can be stored on any computer readable medium for use by or in connection with a computer-related system or method.

Computer readable program instructions described herein can be downloaded to processing elements from a computer readable storage medium, via a network, for example, the Internet and/or a wireless network. A network adapter card or network interface may receive computer readable program instructions from the network and forwards such instructions for storage in a computer readable storage medium interfaced with the processing means.

Aspects of the present invention are described herein with reference to flowcharts (FIGS. 2-4) and a block diagram (FIG. 1). It will be understood that each block, or combinations of blocks, of the flowchart and the block diagram can be implemented by computer readable program instructions.

These computer readable program instructions may be provided to one or more processing elements as described above, to produce a machine, such that the instructions, which execute via the one or more processing elements create means for implementing the functions or acts specified in the block or blocks of the flowcharts. These computer readable program instructions may also be stored on a computer readable storage medium.

The flowcharts and the block diagram in the accompanying drawings illustrate the architecture, functionality, and operation of possible implementations of the computerized systems, networks, and methods of operating them, and computer program products according to various embodiments of the present invention. Note that each computer-implemented block in the flowchart or the block diagram may represent a module, or a portion of instructions, which comprises executable instructions for implementing the functions or acts specified therein. In variants, the functions or acts mentioned in the blocks may occur out of the order specified in the figures. For example, two blocks shown in succession may actually be executed in parallel, concurrently or still in a reverse order, depending on the functions involved and the algorithm optimization retained. It is also reminded that each block and combinations thereof can be adequately distributed among special purpose hardware components.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computerized method of determining cognitive models to be deployed at auxiliary devices, the method comprising, at a core computing system (CCS):
   maintaining relations that map hardware characteristics of auxiliary devices and example datasets to cognitive models; and
   for each of the auxiliary devices:
      accessing an input dataset comprising focal data collected at the CCS and hardware characteristics of said each of the auxiliary devices,
      determining an auxiliary cognitive model based on a core cognitive model run on the input dataset accessed, wherein the core cognitive model has been trained to learn at least part of said relations, and
      communicating parameters of the auxiliary model determined to said each of the auxiliary devices for the latter to deploy the auxiliary model determined,
   wherein determining the auxiliary cognitive model comprises generating the auxiliary cognitive model, based on outputs from the core cognitive model run on the input dataset accessed,
   wherein generating the auxiliary cognitive model comprises:
      identifying a candidate cognitive model based on the core cognitive model trained; and
      training the candidate cognitive model identified based on said focal data, taking into account resources for said each of the auxiliary devices as determined from said hardware characteristics.

2. The method according to claim 1, wherein generating the auxiliary cognitive model comprises emulating said each of the auxiliary devices, whereby an execution of the candidate model on said each of the auxiliary devices is simulated at the CCS.

3. The method according to claim 1, wherein said candidate cognitive model is a neural network, and identifying said candidate cognitive model comprises identifying an architecture for the neural network, based on the core cognitive model trained.

4. The method according to claim 3, wherein training the candidate cognitive model comprises quantizing weights of the neural network.

5. The method according to claim 1, wherein identifying the auxiliary cognitive model further comprises:
   determining a subset of the relations as maintained at the CCS, based on the input dataset accessed; and
   running the core cognitive model based on said subset of the relations, so as to identify the candidate cognitive model.

6. The method according to claim 5, wherein
the core cognitive model includes a predictor, whereby running the core cognitive model comprises predicting, with said predictor, performances of multiple candidate cognitive models identified based on said subset of the relations.

7. The method according to claim 6, wherein
the relations as maintained at the CCS capture levels of performances of the cognitive models mapped by said relations, and
identifying the candidate cognitive model further comprises training the predictor based on the subset of the relations determined, prior to predicting said performances of multiple candidate cognitive models with said predictor.

8. The method according to claim 6, wherein
the core cognitive model further includes a genetic evolution algorithm, and
running the core cognitive model further comprises running said genetic evolution algorithm in order to identify said candidate cognitive model from said multiple candidate cognitive models, based on the predicted performances.

9. The method according to claim 8, wherein
the genetic evolution algorithm is run based on user constraints in respect to computational resources to be used by the genetic evolution algorithm.

10. The method according to claim 1, wherein
the input dataset accessed further comprises user constraints in respect of the auxiliary cognitive model to be determined, whereby the auxiliary cognitive model is determined, for each of said auxiliary devices, based on the core cognitive model run based on each of the focal data, the hardware characteristics, and the user constraints accessed for said each of the auxiliary devices.

11. The method according to claim 1, wherein
the method further comprises, at each of the auxiliary devices, deploying an auxiliary cognitive model determined for said each of the auxiliary devices, for it to locally perform computations based on the deployed model.

12. The method according to claim 1, wherein the method further comprises, prior to maintaining said relations:
selecting hardware characteristics of auxiliary devices and example datasets;
defining auxiliary cognitive models; and
training the auxiliary cognitive models defined based on the selected hardware characteristics and example datasets to determine said relations.

13. The method according to claim 1, wherein said relations are maintained in a database, and the method further comprises storing a new relation in said database, the new relation determined based on the auxiliary cognitive model determined for said each of the auxiliary devices.

14. The method according to claim 1, wherein
the method is implemented in a network comprising said CCS and said auxiliary devices, wherein the network has an edge computing architecture and the auxiliary devices are configured as edge computing devices in the network, each of said devices capable to be set in data communication with the CCS.

15. A computerized system, configured to:
establish data communication with any device of a set of auxiliary devices;
maintain relations mapping hardware characteristics of auxiliary devices and example datasets to cognitive models; and
for each of the auxiliary devices:
access an input dataset comprising focal data and hardware characteristics of said each of the auxiliary devices,
determine an auxiliary cognitive model based on a core cognitive model run on the input dataset accessed, wherein the core cognitive model has been trained to learn at least part of said relations, and
communicate parameters of the auxiliary model determined to said each of the auxiliary devices for the latter to deploy the auxiliary model determined,
wherein the computerized system configured to determine the auxiliary cognitive model includes the computerized system configured to generate the auxiliary cognitive model, based on outputs from the core cognitive model run on the input dataset accessed,
wherein the computerized system configured to generate the auxiliary cognitive model includes, the computerized system configured to:
identify a candidate cognitive model based on the core cognitive model trained; and
train the candidate cognitive model identified based on said focal data, taking into account resources for said each of the auxiliary devices as determined from said hardware characteristics.

16. A computerized network having an edge computing architecture, the network comprising a core computing system, or CCS, according to the computer system of claim 15, wherein the network further comprises one or more of said auxiliary devices, the latter configured as edge computing devices in data communication with the CCS.

17. The computerized system of claim 15, wherein the auxiliary cognitive model is generated by at least emulating said each of the auxiliary devices, whereby an execution of the candidate model on said each of the auxiliary devices is simulated at the CCS.

18. The computerized system of claim 15, wherein the auxiliary cognitive model if identified further by at least:
determining a subset of the relations as maintained at the CCS, based on the input dataset accessed; and
running the core cognitive model based on said subset of the relations, so as to identify the candidate cognitive model.

19. A computer program product for determining cognitive models to be deployed at auxiliary devices, the computer program product comprising a computer readable storage medium having program instructions embodied therewith, the program instructions executable by one or more processors of a core computing system (CCS), to cause the latter to:
maintain relations mapping hardware characteristics of auxiliary devices and example datasets to cognitive models; and
for each of the auxiliary devices:
access an input dataset comprising focal data collected from the network and hardware characteristics of said each of the auxiliary devices,
determine an auxiliary cognitive model based on a core cognitive model run on the input dataset accessed, wherein the core cognitive model has been trained to learn at least part of said relations, and
communicate parameters of the auxiliary model determined to said each of the auxiliary devices for the latter to deploy the auxiliary model determined,
wherein the one or more processors of a core computing system (CCS) caused to determine the auxiliary cognitive model includes the one or more processors of a core computing system (CCS) caused to generate the auxiliary cognitive model, based on outputs from the core cognitive model run on the input dataset accessed, wherein the one or more processors of a core computing system (CCS) caused to generate the auxiliary cognitive model includes, the one or more processors of a core computing system (CCS) caused to:
- identify a candidate cognitive model based on the core cognitive model trained; and
- train the candidate cognitive model identified based on said focal data, taking into account resources for said each of the auxiliary devices as determined from said hardware characteristics.

20. The computer program product of claim 19, wherein the auxiliary cognitive model is generated by at least emulating said each of the auxiliary devices, whereby an execution of the candidate model on said each of the auxiliary devices is simulated at the CCS.

\* \* \* \* \*